United States Patent
Ouchi et al.

(10) Patent No.: US 8,762,145 B2
(45) Date of Patent: Jun. 24, 2014

(54) VOICE RECOGNITION APPARATUS

(75) Inventors: Kazushige Ouchi, Saitama (JP);
Toshiyuki Koga, Kawasaki (JP);
Daisuke Yamamoto, Kawasaki (JP);
Miwako Doi, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/430,264

(22) Filed: Mar. 26, 2012

(65) Prior Publication Data

US 2012/0245932 A1 Sep. 27, 2012

Related U.S. Application Data

(63) Continuation of application No. PCT/JP2009/005905, filed on Nov. 6, 2009.

(51) Int. Cl.
*G10L 15/00* (2013.01)
*G10L 21/00* (2013.01)

(52) U.S. Cl.
USPC .......................................... 704/233; 704/270

(58) Field of Classification Search
None
See application file for complete search history.

(56) References Cited

U.S. PATENT DOCUMENTS

| | | | | |
|---|---|---|---|---|
| 6,219,645 B1* | 4/2001 | Byers | ............................. | 704/275 |
| 6,449,593 B1* | 9/2002 | Valve | ............................. | 704/233 |
| 6,820,056 B1* | 11/2004 | Harif | ............................. | 704/275 |
| 7,418,392 B1* | 8/2008 | Mozer et al. | .................. | 704/275 |
| 7,478,041 B2* | 1/2009 | Ichikawa et al. | .............. | 704/233 |
| 7,711,127 B2 | 5/2010 | Suzuki et al. | | |
| 7,835,908 B2* | 11/2010 | Choi et al. | ..................... | 704/233 |
| 8,005,672 B2* | 8/2011 | Vierthaler et al. | ............. | 704/233 |
| 8,073,690 B2* | 12/2011 | Nakadai et al. | ................ | 704/233 |
| 8,103,504 B2* | 1/2012 | Ohguri et al. | .................. | 704/258 |
| 8,271,200 B2* | 9/2012 | Sieracki | ........................... | 702/19 |
| 8,321,214 B2* | 11/2012 | Chan et al. | ..................... | 704/225 |
| 2002/0001389 A1* | 1/2002 | Amiri et al. | ...................... | 381/56 |
| 2002/0181723 A1 | 12/2002 | Kataoka | | |
| 2003/0009329 A1* | 1/2003 | Stahl et al. | ..................... | 704/233 |
| 2003/0097257 A1* | 5/2003 | Amada et al. | .................. | 704/208 |
| 2006/0195316 A1* | 8/2006 | Sakuraba | ....................... | 704/208 |

(Continued)

FOREIGN PATENT DOCUMENTS

| | | |
|---|---|---|
| CN | 101136136 A | 3/2008 |
| JP | 3069036 U | 3/2000 |

(Continued)

OTHER PUBLICATIONS

Combined Office Action and Search Report issued Jan. 28, 2013 in Chinese Patent Application No. 200980161199.3 with English translation.

(Continued)

*Primary Examiner* — Brian Albertalli
(74) *Attorney, Agent, or Firm* — Oblon, Spivak, McClelland, Maier & Neustadt, L.L.P.

(57) ABSTRACT

According to one embodiment, a voice recognition apparatus includes a determination unit, an estimating unit, and a voice recognition unit. The determination unit determines whether a component with a frequency of not less than 1000 Hz and with a level not lower than a predetermined level is included in a sound input from a plurality of microphones. The estimating unit estimates a sound source direction of the sound when the determination unit determines that the component is included in the sound. The voice recognition unit recognizes whether the sound obtained in the sound source direction coincides with a voice model registered beforehand.

2 Claims, 8 Drawing Sheets

(56) References Cited

U.S. PATENT DOCUMENTS

| | | |
|---|---|---|
| 2008/0089531 A1 | 4/2008 | Koga et al. |
| 2009/0018828 A1* | 1/2009 | Nakadai et al. ............... 704/234 |
| 2010/0076763 A1 | 3/2010 | Ouchi et al. |
| 2011/0301950 A1 | 12/2011 | Ouchi et al. |
| 2012/0162540 A1 | 6/2012 | Ouchi et al. |

FOREIGN PATENT DOCUMENTS

| | | |
|---|---|---|
| JP | 2002-247569 A | 8/2002 |
| JP | 2002-366191 | 12/2002 |
| JP | 2007-121579 A | 5/2007 |
| JP | 2007-221300 A | 8/2007 |
| JP | 2009-31706 | 2/2009 |

OTHER PUBLICATIONS

International Search Report issued Feb. 2, 2010 in PCT/JP2009/005905 filed Nov. 6, 2009 (with English Translation).

Written Opinion Report issued Feb. 2, 2010 in PCT/JP2009/005905 filed Nov. 6, 2009.

Chinese Office Action mailed on Oct. 18, 2013, in Chinese Patent Application No. 2013101500926850 (with English Translation).

* cited by examiner

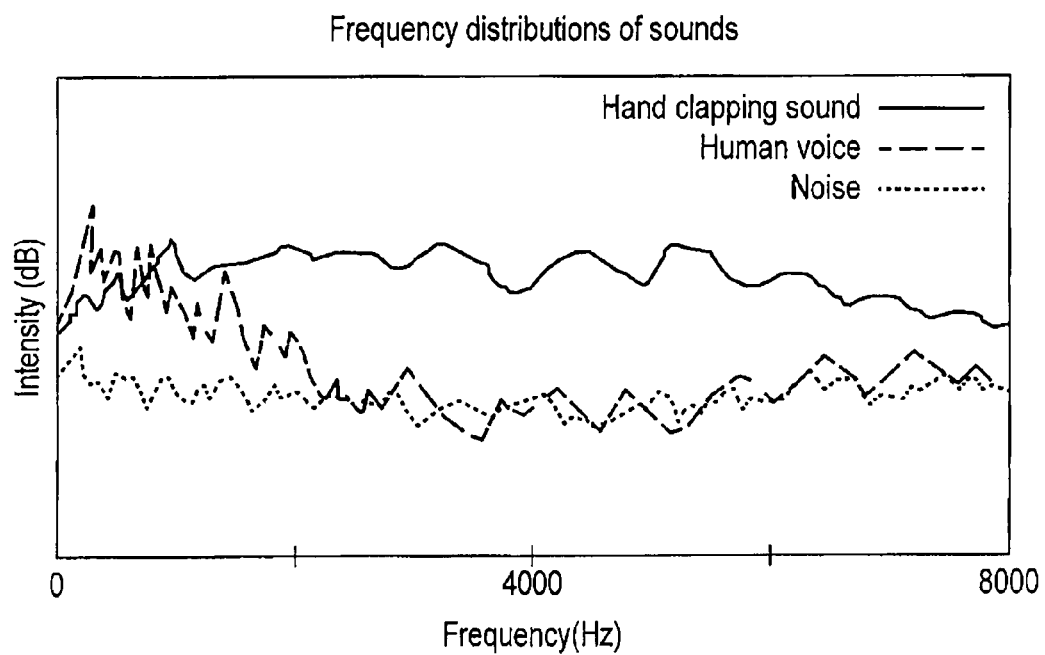
F I G. 4
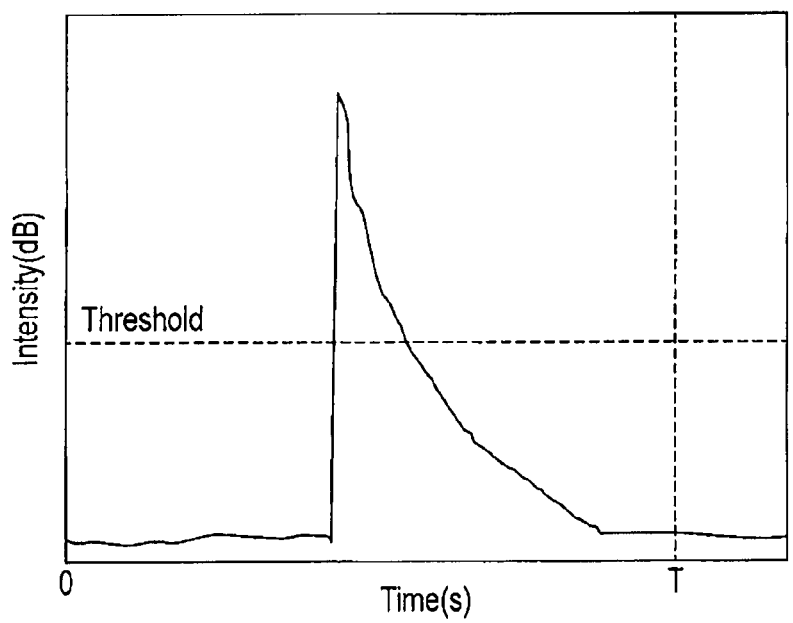
F I G. 5

| Operation instruction | Voice model(English) |
|---|---|
| Set channel 1 | channel one |
| Set channel 1 | nhk |
| Set channel 2 | channel two |
| Set channel 2 | etv |
| ... | |
| Turn up volume a little | up |
| Turn up volume considerably | up up |
| Turn down volume a little | down |
| Turn down volume considerably | down down |
| Set volume to low (defined value) | low |
| Set volume to medium (defined value) | medium |
| Set volume to high (defined value) | loud |
| Mute | mute |
| ... | |
| Turn off | turn off |
| Turn off | turn off |
| ... | |
| ... | |

FIG. 6

| Operation instruction | Voice model(English) |
|---|---|
| Display today's weather forecast | weather report |
| Display today's weather forecast | today's weather |
| Display weather forecast for tomorrow | tomorrow's weather |
| Display this week's weather forecast | this week's weather |
| ... | |
| Display sports news | sports |
| Display baseball news | baseball |
| Display result of Giants game | giants |
| Display soccer news | soccer |
| ... | |
| Display exchange rate | exchange rate |
| ... | |
| Display time table of nearest bus stop | bus |
| Display time table of nearest station | train |
| ... | |
| ... | |

FIG. 7

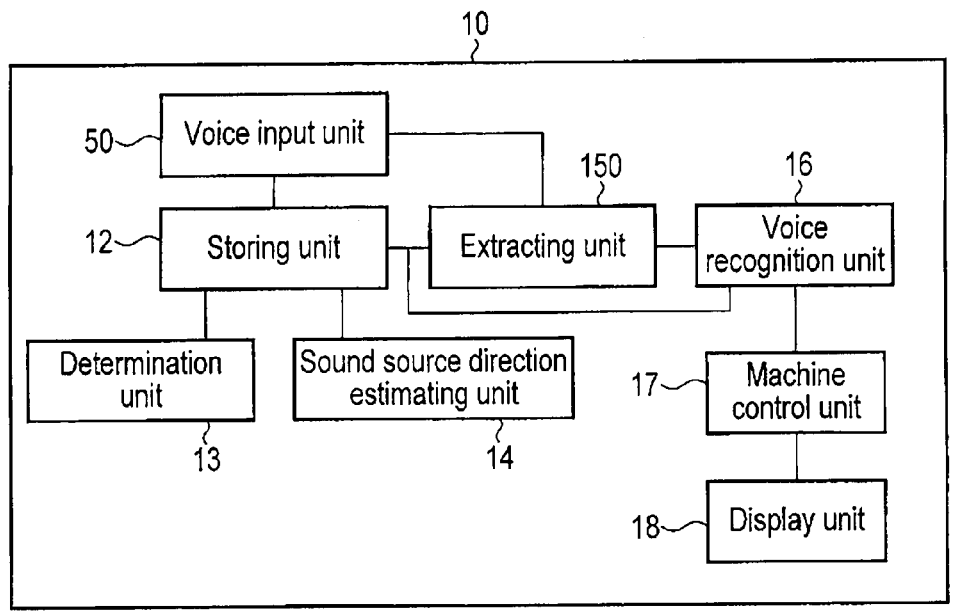

FIG. 8

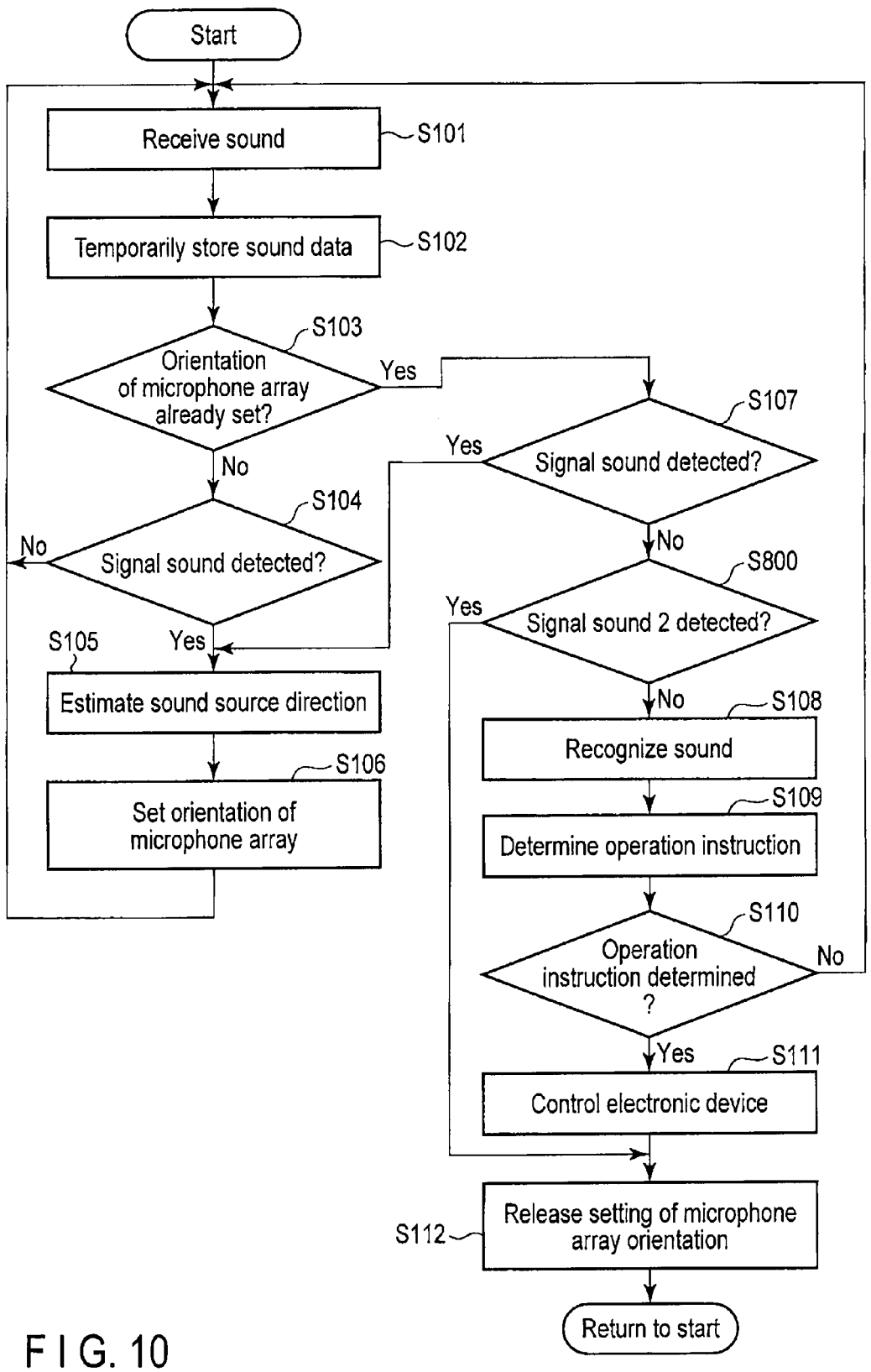
F I G. 10

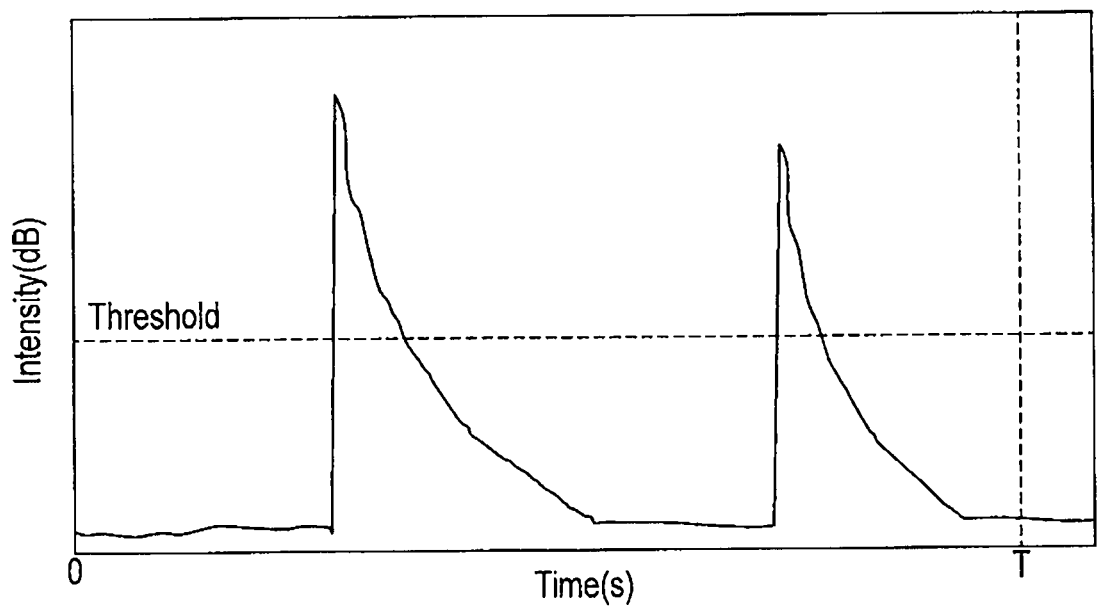
F I G. 11

VOICE RECOGNITION APPARATUS

CROSS-REFERENCE TO RELATED APPLICATIONS

This application is a Continuation Application of PCT Application No. PCT/JP2009/005905, filed Nov. 6, 2009, the entire contents of which are incorporated herein by reference.

FIELD

Embodiments described herein relate generally to voice recognition apparatuses.

BACKGROUND

JP-A 2002-366191 (KOKAI) discloses a voice recognition apparatus in which the voice emitted by a speaker is detected, and a microphone array is oriented in the direction of emission of the voice.

More specifically, in the voice recognition apparatus, it is determined whether the sound pressure and duration of an input voice exceed predetermined threshold values, to thereby estimate the direction of the sound source and set the orientation of the microphone array based on the estimation result. The voice detected in the estimated direction is emphasized to be recognized.

However, the disclosed voice recognition apparatus may detect sound (e.g., a noise, such as a sound occurring when a door is closed) other than the voice of a speaker. In this case, the microphone array may be oriented in the direction of the noise, with the result that accurate voice recognition may not be achieved.

BRIEF DESCRIPTION OF THE DRAWINGS

FIG. 4 is a schematic view illustrating examples of the frequency distributions of input noise, human voice and hand clapping sound;

FIG. 5 is a graph illustrating changes with time in the hand clapping sound;

FIG. 6 is a table illustrating a database example associated with operation instructions;

FIG. 7 is a table illustrating another database example associated with operation instructions;

FIG. 8 is a block diagram illustrating a voice recognition apparatus according to a first modification of the first embodiment;

FIG. 10 is a flowchart illustrating a processing flow example of the voice recognition apparatus of the second embodiment; and FIG. 11 is a graph illustrating changes with time in hand clapping sound occurring when the hands are clapped twice.

DETAILED DESCRIPTION

Embodiments will be described in detail with reference to the accompanying drawings.

In the embodiments described below, like reference numbers denote like elements, and duplicate description will be avoided.

In general, according to one embodiment, a voice recognition apparatus includes a determination unit, an estimating unit, and a voice recognition unit. The determination unit determines whether a component with a frequency of not less than 1000 Hz and with a level not lower than a predetermined level is included in a sound input from a plurality of microphones. The estimating unit estimates a sound source direction of the sound when the determination unit determines that the component is included in the sound. The voice recognition unit recognizes whether the sound obtained in the sound source direction coincides with a voice model registered beforehand.

The embodiments have been developed in light of the above problem, and aim to provide a voice recognition apparatus enhanced in voice recognition precision.

First Embodiment

A voice recognition apparatus 10 according to a first embodiment detects a sound (hereinafter referred to as a "signal sound") emitted by the operation of a speaker, thereby orienting, toward the source of the signal sound, a microphone array included in a voice input unit, recognizing the voice of the speaker, and controlling an electronic device, such as a television receiver. The signal sound is, for example, a clapping sound of a plurality of portions (e.g., the hands) of the body, a finger flipping sound, a sound of striking something by a finger or hand, etc. In the first embodiment, hand clapping sound is used as the signal sound.

Figure 1:
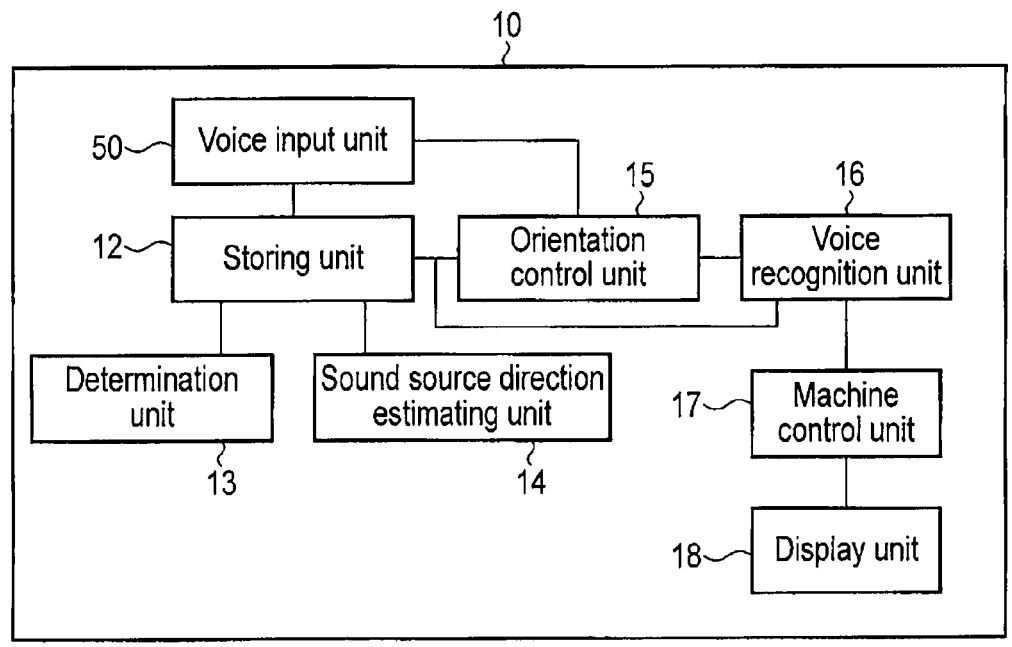
FIG. 1 is a block diagram illustrating a voice recognition apparatus according to a first embodiment.

FIG. 1 is a block diagram illustrating a voice recognition apparatus according to the first embodiment. The voice recognition apparatus 10 comprises a voice input unit 50, a storing unit 12, a determination unit 13, a sound source direction estimating unit 14, an orientation control unit 15, a voice recognition unit 16, a machine control unit 17, and a display unit 18.

The voice input unit 50 includes one or a plurality of microphone arrays.

In the first embodiment, the voice input unit 50 includes one microphone array 11.

The voice input unit 50 receives an external sound or a human voice and stores it as sound data in the storing unit 12.

The storing unit 12 stores, as well as the sound data, voice models necessary for the voice recognition unit 16, described later, to recognize voices.

The determination unit 13 determines whether the sound data stored in the storing unit 12 includes sound data that satisfies a predetermined condition, described later.

The sound source direction estimating unit 14 estimates the direction of the sound source associated with the sound data (i.e., the direction in which the signal sound is detected), based on the determination result of the determination unit 13.

The orientation control unit 15 sets the orientation of the microphone array 11 in the sound source direction estimated by the sound source direction estimating unit 14.

The orientation control unit 15 outputs a recognition start instruction to the voice recognition unit 16 after the setting of the orientation of the microphone array 11 is completed.

The voice recognition unit 16 receives the recognition start instruction from the orientation control unit 15.

The voice recognition unit 16 recognizes the voice of a speaker, based on the sound data obtained using the microphone array 11 having its orientation set by the orientation control unit 15, and determines an operation instruction to be sent to an electronic device (not shown).

The machine control unit 17 provides the electronic device as a control target with an instruction corresponding to the voice recognized by the voice recognition unit 16.

The display unit 18 informs the speaker that the voice recognition unit 16 is in a voice receiving state.

The voice recognition apparatus 10 may be built in, for example, the electronic device as the control target, or be externally connected to the electronic device. In the first embodiment, the electronic device as the control target is the television receiver 20. However, the embodiment is not limited to this, and is also applicable to other types of electronic devices, such as a personal computer, a video recorder, an air conditioner, in-vehicle equipment, etc., in which an operation by the speaker is accepted during use of the device.

The determination unit 13, the sound source direction estimating unit 14, the orientation control unit 15, the voice recognition unit 16, and the machine control unit 17 can be realized by a central processing unit (CPU) executing a program stored in a computer readable memory.

The storing unit 12 may be installed in the voice recognition apparatus 10, or be provided outside the apparatus 10.

The voice recognition apparatus 10 according to the first embodiment will be described in detail.

Figure 2:
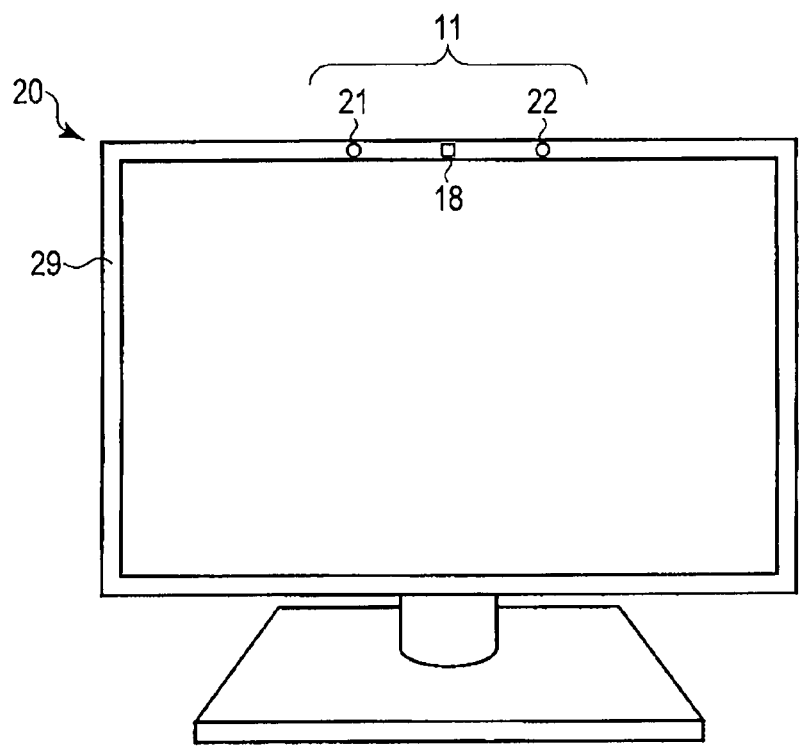
FIG. 2 is a schematic view illustrating a microphone array incorporated in the voice recognition apparatus.

FIG. 2 is a schematic view illustrating an arrangement example of the microphone array 11 in the voice recognition apparatus 10.

Although the microphone array 11 of the first embodiment includes two microphones 21 and 22, it may include three or more microphones.

The microphone array 11 may be provided on, for example, the upper end portion of the casing 29 of the television receiver 20 in parallel with the length of the apparatus.

The microphones 21 and 22 convert input voice to electrical signals.

The microphones 21 and 22 can set their orientations toward a position where the speaker usually views the television receiver 20.

FIG. 4 shows frequency distribution examples of the noise, human voice and hand clapping sound input to the microphones 21 and 22.

The horizontal axis in FIG. 4 indicates the frequency (ranging from 0 Hz to 8000 Hz), and the vertical axis indicates the intensity of sound. As shown, the intensity of noise is substantially uniform in the frequency range of from 0 Hz to 8000 Hz. The intensity of the human voice exhibits higher values than the noise in the frequency range of from 0 Hz to 8000 Hz, and exhibits the same frequency distribution as the noise in the frequency range of 2000 Hz or more.

The intensity of the hand clapping sound exhibits higher values than the noise and the human voice in the frequency range of from 1000 Hz to 8000 Hz.

FIG. 5 shows an example of a variation with time in the component having a frequency of 4000 Hz included in the hand clapping sound. In FIG. 5, the horizontal axis expresses time in units of seconds, and the vertical axis indicates the intensity of sound.

In the first embodiment, the voice recognition apparatus 10 detects the hand clapping sound of a speaker as a signal sound for setting the orientation of the microphone array 11.

Figure 3:
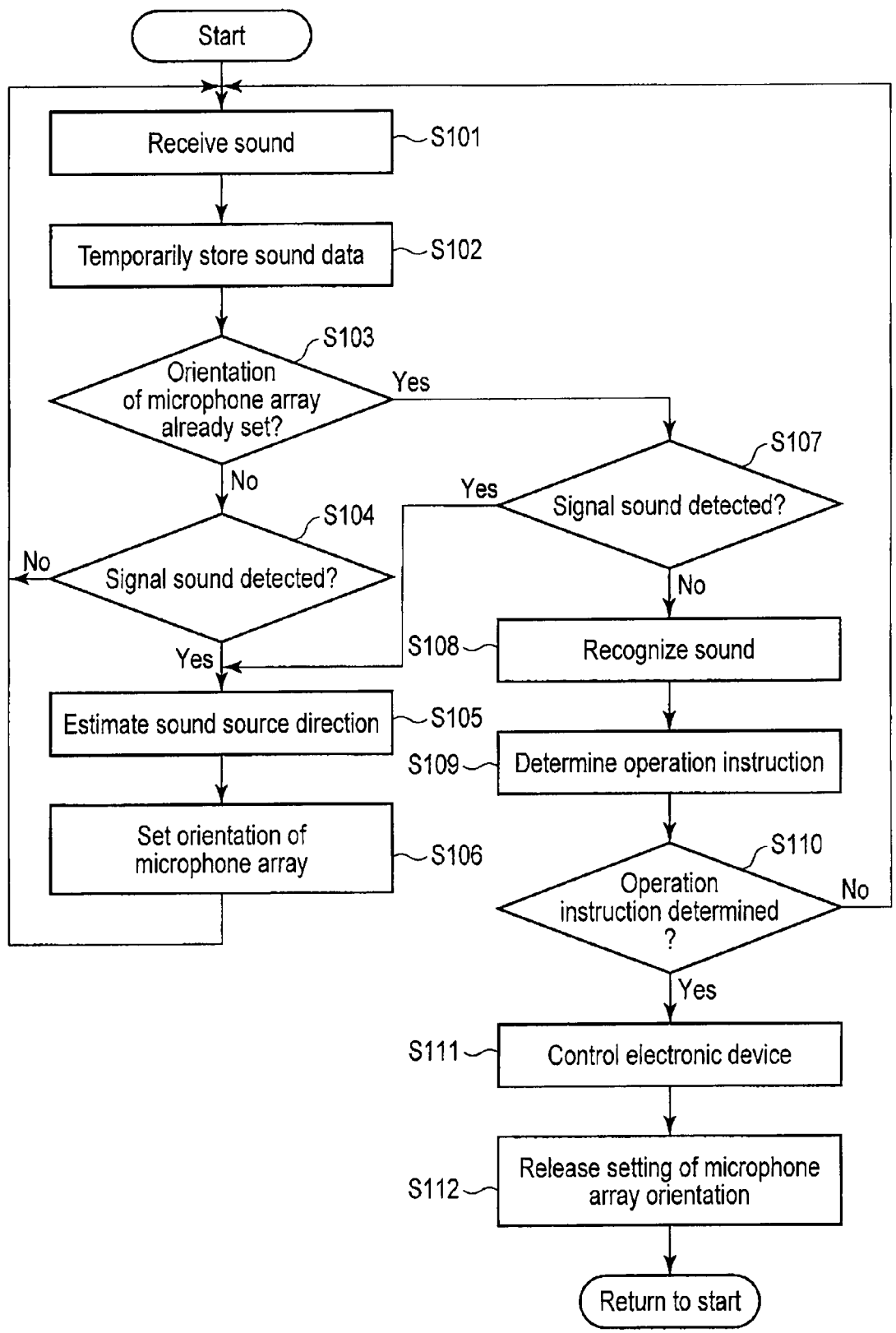
FIG. 3 is a flowchart illustrating a processing flow example of the voice recognition apparatus.

FIG. 3 is a flowchart illustrating a process flow example of the voice recognition apparatus 10.

The process flow is started from a state in which the setting of the orientation of the microphone array 11 is released.

The voice recognition apparatus 10 receives the voice or sound of a speaker using the microphones 21 and 22 (step S101).

The sound is converted into electric signals by the microphones 21 and 22, and the sound data indicated by the electric signals is stored for a predetermined period in the storing unit 12 as sound data organized on a frequency basis (step S102).

The period for which the sound data is stored may be predetermined or be arbitrarily determined by the speaker.

The storing unit 12 stores data corresponding to the sound collected during the period ranging from time 0 (s) to time T (s) in FIG. 5. In FIG. 5, the peak level of the sound, which exceeds a predetermined threshold, exists during the period from time 0 (s) to time T (s).

The determination unit 13 determines whether the orientation of the microphone array 11 is set (step S103).

If the answer to the question at step S103 is NO, the determination unit 13 searches the sound data stored in the storing unit 12 for sound data of a predetermined frequency, and determines whether the intensity of the searched sound data is not less than a predetermined threshold (hereinafter, a "predetermined intensity threshold"), whereby determining whether a signal sound is detected (step S104).

The predetermined intensity threshold may be preset in accordance with the level of the signal sound, or be arbitrarily set by the speaker.

For instance, the determination unit 13 can determine whether the sound data with a frequency of 4000 Hz once exceeded the predetermined intensity threshold during the predetermined period ranging from time 0 (s) to time T (s), as is shown in FIG. 5.

As is evident from FIG. 4, the determination unit 13 can discriminate a signal sound from a non-signal sound, e.g., hand clapping sound from noise, or hand clapping sound from human voice, if the predetermined intensity threshold is set higher than the intensity of the noise or the human voice and lower than the hand clapping sound.

The determination unit 13 may utilize one or a plurality of frequencies for the determination as to whether a detected sound is a signal sound.

For instance, the determination unit 13 may perform the determination using a frequency of 4000 Hz, or a plurality of frequencies, such as 3000 Hz and 5000 Hz. When employing a plurality of frequencies for determination, it is determined whether the intensities of components corresponding to all the frequencies exceed the predetermined intensity threshold.

If the answer to the question at step S104 is NO, the determination unit 13 outputs a signal for starting storage of new sound data to the storing unit 12.

At this time, the program returns to step S101, where the storing unit 12 temporarily stores new sound data.

In contrast, if the answer to the question at step S104 is YES, the sound source direction estimating unit 14 estimates the sound source direction of the sound having an intensity exceeding the predetermined intensity threshold, based on the sound data stored in the storing unit 12 (step S105).

For the sound source direction estimation, a known methods, such as a method of calculating the difference between the arrival times of the sounds input to the microphones 21 and 22 of the microphone array 11, or a beam forming method, can be used.

The orientation control unit 15 outputs a control signal to the microphone array 11, and adjusts the orientation of the microphone array 11 in the sound source direction (i.e., the direction of the signal sound) estimated by the sound source direction estimating unit 14 (step S106).

As a result of the setting of orientation, the microphone array 11 detects the sound in the set direction and receives it in an emphasized mode.

To set the orientation of the microphone array 11, a fixed-type method using an element represented by a delay-sum array, or an adaptive type method using an element represented by a Griffith-Jim type array, can be utilized.

After setting the orientation of the microphone array 11, the orientation control unit 15 outputs a notice start signal to the display unit 18.

Upon receiving the notice start signal from the orientation control unit 15, the display unit 18 notifies the speaker that the voice recognition unit 16 is in a voice receiving state. For instance, the display unit 18 may be formed of an LED, and notification may be performed by turning on the LED. Alternatively, a message indicating the voice receiving state may be displayed to notify the speaker of it.

After setting the orientation of the microphone array 11 in the direction of the signal sound, the orientation control unit 15 provides the storing unit 12 with a storage start signal for starting storage of new sound data.

The program returns to step S101, where the storing unit 12 receives the storage start signal from the orientation control unit 15, and resumes storage of the sound input to the microphone array 11.

If the answer of the determination unit 13 to the question at step S103 is YES, the determination unit 13 again determines whether a signal sound is detected (step S107).

If the answer of the determination unit 13 to the question at step S107 is YES, the program proceeds to step S105.

In contrast, if the answer of the determination unit 13 to the question at step S107 is NO, the voice recognition unit 16 performs voice recognition based on the sound data stored in the storing unit 12 (step S108).

The voice recognition unit 16 extracts a voice model that coincides with the sound data stored in the storing unit 12, and determines an operation instruction corresponding to the voice model (step S109).

FIG. 6 shows an example of database data of operation instructions stored in the storing unit 12. FIG. 7 shows another example of database data of operation instructions stored in the storing unit 12. The database data includes voice models for input voices, and operation instructions corresponding thereto. The voice models are not limited to Japanese voice models, but models of another language, such as English, may be employed.

For instance, when a voice "nhk" is input, the voice recognition unit 16 searches the storing unit 12 for a voice model that coincides with the voice "nhk," and determines an operation instruction "set the channel to 1" corresponding to the voice model and used to operate the electronic device main unit (see FIG. 6). Further, when a voice "weather report" is input, the voice recognition unit 16 searches the storing unit 12 for a voice model that coincides with the voice "weather report," and determines an operation instruction to display information "display today's weather forecast" corresponding to the voice model (see FIG. 7).

In FIGS. 6 and 7, the voice models are expressed in words, instead of pronunciation symbols.

In the database of operation instructions stored in the storing unit 12, a plurality of voice models may be made to correspond to one operation instruction. For instance, as shown in FIG. 6, "channel one" and "nhk" may be made to correspond to an operation instruction "set channel to 1."

When the electronic device is the television receiver 20, the recognition accuracy of the voice recognition unit 16 can be enhanced by providing the television receiver 20 with a function of turning off the operation of the loud speaker of the television receiver 20 while the voice recognition unit 16 is receiving voice, or with an echo cancelling function.

The voice recognition unit 16 determines whether an operation instruction is determined (step S110).

If the answer to the question at step S110 is YES, the voice recognition unit 16 outputs an operation signal to the machine control unit 17.

The machine control unit 17 receives the operation signal from the voice recognition unit 16, and provides the electronic device with an operation instruction corresponding to the operation signal to thereby control the electronic device (step S111).

The orientation control unit 15 outputs a control signal to the microphone array 11 to release the setting of the orientation of the microphone array 11 (step S112).

If the answer to the question at step S110 is NO, the program returns to step S101, where the voice recognition unit 16 provides the storing unit 12 with a signal for starting storage of new sound data.

The program returns to step S101, where the storing unit 12 resumes storage of the sound input to the microphone array 11.

As a result of the above-mentioned process, the voice recognition apparatus can perform accurate voice recognition.

In the above-described first embodiment, the microphone array 11 is used for both the estimation of the sound source direction and the voice recognition. However, the embodiment is not limited to this, but may be modified, for example, such that two or more microphones independent of the microphone array 11 are used for the estimation of the sound source direction, and the microphone array 11 be used for the voice recognition.

Further, in the first embodiment, after the determination unit 13 determines the signal sound, the orientation of the microphone array 11 is set to recognize the voice of a speaker. However, the embodiment may be further modified as described below.

First Modification

For instance, the speaker may emit a voice a predetermined period of time after the emission of a signal sound.

FIG. 8 is a block diagram illustrating a first modification of the voice recognition apparatus of the first embodiment.

In this modification, the orientation control unit 15 is replaced with an extracting unit 150. The extracting unit 150 extracts, from the storing unit 12, sound data obtained in the sound source direction estimated by the sound source direction estimating unit 14, and emphasizes the sound data.

This process is performed as follows (no flowchart is given thereto):

Sound data indicative of a signal sound, and sound data indicative of a voice (hereinafter, an operation voice) emitted by a speaker to operate the electronic device, are simultaneously stored in the storing unit 12. The determination unit 13 determines the signal sound. The sound source direction estimating unit 14 estimates the sound source direction of the signal sound. The extracting unit 150 extracts, from the storing unit 12, sound data obtained in the sound source direction estimated by the sound source direction estimating unit 14, and emphasizes the sound data. For instance, to emphasize the sound data obtained in the sound source direction, the extracting unit 150 may correct the sound data items, input through microphones 21 and 22 to the storing unit 12, by the time computed based on the sound source direction of the signal sound, thereby adjusting the sound data items in phase.

The voice recognition unit 16 performs voice recognition. The voice recognition unit 16 determines an operation instruction. The machine control unit 17 provides the operation instruction to the electronic device to control the same.

This enables sound data substantially equivalent to that obtained when the orientation direction is set to be provided to the voice recognition unit 16, without setting the orientation direction of the microphone array 11. As a result, the voice recognition unit 16 can accurately recognize the voice of the speaker. Thus, in this structure, it is desirable that the microphones 21 and 22 have no directivity.

Second Modification

The voice recognition apparatus 10 of the first modification can be further modified as follows:

For example, the apparatus may firstly accept an operation voice emitted from a speaker, and then accept, a preset period of time after, a signal sound emitted from the speaker. In this case, sound data indicative of the operation voice and sound data indicative of the signal sound are simultaneously stored in the storing unit 12. The determination unit 13 determines the signal sound. The sound source direction estimating unit 14 estimates the sound source direction of the signal sound. The extracting unit 150 extracts, from the storing unit 12, sound data stored before the sound data indicative of the signal sound, emphasizes the sound data obtained in the sound source direction. The voice recognition unit 16 determines an operation instruction. The machine control unit 17 provides the operation instruction to the electronic device to control the same.

This enables the voice recognition apparatus to recognize the voice of a speaker not only when the speaker emits the operation voice after emitting a signal sound, but also when the speaker emits the signal sound after emitting the operation voice. As a result, the operability of the voice recognition apparatus is enhanced.

Second Embodiment

Figure 9:
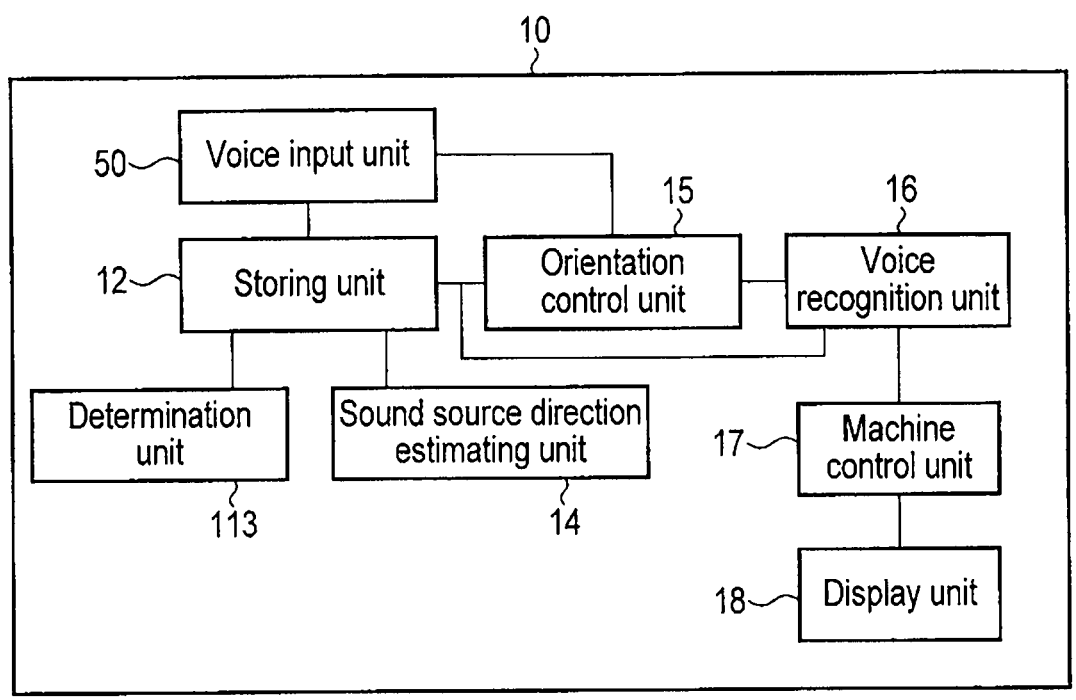
FIG. 9 is a block diagram illustrating a voice recognition apparatus according to a second embodiment.

FIG. 9 is a block diagram illustrating a voice recognition apparatus 100 according to a second embodiment.

As shown in FIG. 9, the voice recognition apparatus 100 of the second embodiment differs from the first embodiment in that the former employs a determination unit 113 in place of the determination unit 13 in the voice recognition apparatus 10 of the first embodiment. The determination unit 113 will be described later.

A voice recognition apparatus 100 is configured to estimate the direction in which a speaker exists, using, as a signal sound (hereinafter, signal sound 1), the sound caused by a personal habit of "clapping the hands twice" that is performed when a person attempts to catch another person's attention, to emphasize the voice emitted in the same direction, and to recognize the voice. Further, the voice recognition apparatus 100 can be further configured to, for example, use, as a signal sound 2, the sound caused by clapping hands three times, to release the once set orientation of the microphone array 11 in order to enable the array 11 to resume receiving of sound.

The voice recognition apparatus 100 differs from the voice recognition apparatus 10 in the determination content of the determination unit 113.

FIG. 10 is a flowchart illustrating a process flow example of the voice recognition apparatus 100.

In the process flow below, no description will be given of the same steps as those of the process flow of the voice recognition apparatus 10.

As shown in FIG. 10, the process flow differs between the voice recognition apparatuses 10 and 100 in that the apparatus 100 employs step S800 between steps S107 and 108, and in the content of steps S104 and S107.

FIG. 11 is a view illustrating variation with time in frequency that occurs when hands are clapped twice.

In FIG. 11, two peak levels exceeding a predetermined threshold exist between time 0(s) and time T(s).

The determination unit 113 searches the storing unit 12 for the sound data of a frequency not lower than 1000 Hz, and determines whether the intensity of the sound data exceeded a predetermined intensity threshold twice within a preset period of time (S104).

For instance, the determination unit 113 determines whether the intensity of the sound data with a frequency of 4000 Hz exceeded the predetermined intensity threshold twice within a constant period of from 0(s) to T(s), as is shown in FIG. 11.

When determining that the intensity of sound data with a frequency of 1000 Hz or more exceeded the predetermined intensity threshold twice within the constant period of time, the determination unit 113 determines that the signal sound 1 occurred.

The same process is performed at step S107.

By thus utilizing, as a signal sound, the sound caused by a personal habit of "clapping the hands twice" that is performed when a person attempts to catch another person's attention, voice recognition can be performed accurately. Namely, the signal sound can be further accurately discriminated from noise, such as door's closing sound, which suddenly occurs.

If the answer to the question at step S107 is NO, the determination unit 113 searches the storing unit 12 for sound data with a frequency of 1000 Hz or more, and determines whether the intensity of the sound data exceeded the predetermined intensity threshold three times (step S800).

If the intensity of the sound data with the frequency of 1000 or more exceeded the predetermined intensity threshold three times within the constant period of time, the determination unit 113 determines that the signal sound 2 occurred.

If the answer to the question at step S800 is YES, the program proceeds to step S112, where the orientation control unit 15 outputs a control signal to the microphone array 11 to release the orientation setting for the microphone array 11.

The determination unit 113 outputs a signal for causing the storing unit 12 to start storage of new sound data.

The program returns to step S101, where the storing unit 12 temporarily stores new sound data.

If answer to the question at step S800 is NO, the program proceeds to step S108.

In the above-described process, by changing the number of times of hand clapping, the speaker can cause the voice recognition apparatus 100 to set the orientation of the microphone array and to release the setting.

The number of times of hand clapping for the signal sound 2 is not limited to three, but may be set to once or four times or more, except for twice.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A voice recognition apparatus comprising:
a determination unit configured to determine whether a hand clapping sound having a level not lower than a predetermined level and occurring when hands of a speaker are clapped is included in a sound input from a microphone array;
an estimating unit configured to estimate a sound source direction of the sound when the determination unit determines that the hand clapping sound is included in the sound;
a voice recognition unit configured to recognize whether the sound obtained in the sound source direction coincides with a voice model registered beforehand; and
an orientation control unit configured to adjust the orientation of the microphone array in the sound source direction of the sound,
wherein when the determination unit determines that the hand clapping sound is included in the sound, the orientation control unit adjusts the orientation of the microphone array and the voice recognition unit operates.

2. A voice recognition apparatus comprising:
a determination unit configured to determine whether a hand clapping sound having a level not lower than a predetermined level and occurring when hands of a speaker are clapped is included in a sound input from a microphone array;
an estimating unit configured to estimate a sound source direction of the sound when the determination unit determines that the hand clapping sound is included in the sound;
a voice recognition unit configured to recognize whether the sound obtained in the sound source direction coincides with a voice model registered beforehand; and
an orientation control unit configured to adjust the orientation of the microphone array in the sound source direction of the sound,
wherein when the determination unit determines that the hand clapping sound is included in the sound, the orientation control unit adjusts the orientation of the microphone array and the voice recognition unit operates, and
the determination unit further determines whether the sound is detected twice within a predetermined period of time.

* * * * *